(No Model.)
W. N. CARLISLE.
TOE WEIGHT.
No. 539,379. Patented May 14, 1895.
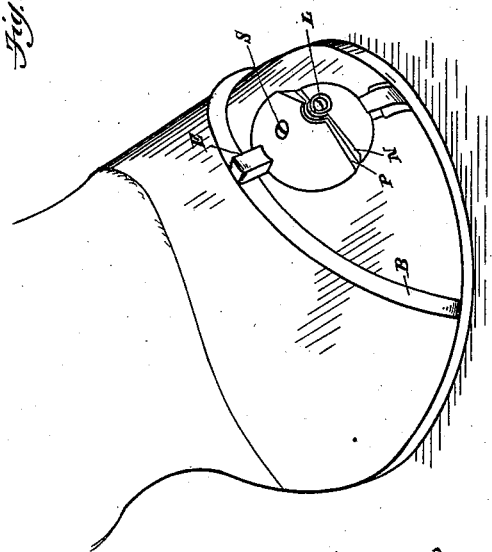
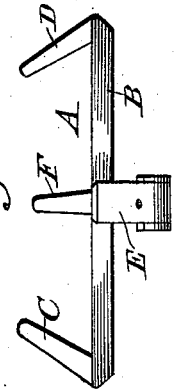
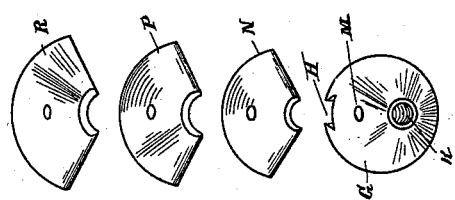
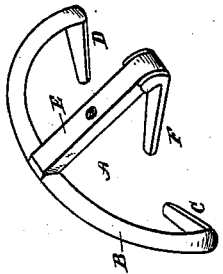
WITNESSES
F. Clough
G. H. Bradford
INVENTOR
William N. Carlisle
By Parker & Burton
Attorneys.

UNITED STATES PATENT OFFICE.

WILLIAM N. CARLISLE, OF DETROIT, MICHIGAN, ASSIGNOR OF ONE-HALF TO GEORGE H. PAINE, OF SAME PLACE.

TOE-WEIGHT.

SPECIFICATION forming part of Letters Patent No. 539,379, dated May 14, 1895.

Application filed June 25, 1894. Serial No. 515,593. (No model.)

*To all whom it may concern:*

Be it known that I, WILLIAM N. CARLISLE, a citizen of the United States, residing at Detroit, county of Wayne, State of Michigan, have invented a certain new and useful Improvement in Toe-Weights; and I declare the following to be a full, clear, and exact description of the invention, such as will enable others skilled in the art to which it pertains to make and use the same, reference being had to the accompanying drawings, which form a part of this specification.

This invention relates to toe-weights for horses, and has for its object an improvement to be made upon the invention described in my previous patent, No. 518,206, granted April 10, 1894, the especial object to be arrived at consisting in the production of a toe-weight which can be attached to the hoof of a horse without bending the prongs behind the shoe in the manner described in the patent referred to, and also in attaching to the front bar of that fastening a divisible weight.

In the drawings, Figure 1 shows the hoof of the horse with the toe-weight frame and the toe-weight attached. Fig. 2 shows the toe-weight frame; Fig. 3 shows the several portions of the divisible toe-weight and indicates the manner in which they are secured one to another. Fig. 4 is a plan view of the toe-weight frame. Fig. 5 shows a sectional view of the dovetailed weight-holding post.

The frame A is made of metal bent or cast in shape, and consists of a bowed part B, on each side of which is a spring C or D, and from the middle part of which extends a post E that reaches to the extreme forward part of the hoof of the horse, and terminates in a prong F that bends back under the hoof of the horse.

The post E is dovetailed in cross section with its wider part at the outside and its narrower part lying to the inside against the hoof, and at its point of junction with the bowed part B, lies above the surface of the bow so that the toe weight G can be readily engaged and disengaged from the post E at the point of junction between the post and the bow B.

The weight G is in the form of a cone, with a concave base fitting it over the curved upper surface of the hoof to which this inner base surface of the cone lies substantially parallel, although not necessarily in contact with the surface of the hoof. It is formed with a dovetailed groove H adapted to engage with the post E, and which serves to hold the weight upon the post. In the apex of the weight G is a screw hole K through which is inserted a holding screw L.

On the upper surface of the cone, as it rests in place on the hoof of the horse, is another screw hole M, to receive a screw by means of which an additional section or additional sections of the toe-weight can be secured to the main part G of the weight. Each of these sections is fastened to the position it is to occupy. The section N corresponds on its inner or concave side to the convex side of the weight G, and on its convex side is arranged to form with the cone G a substantially symmetrical conical body. So also the weight P, when placed in position on the weight N, forms a symmetrical conical complete weight with the part N and the part G. Likewise the part R, may be placed on the weight P, with the same result. The screw S holds the sections together, and of course any number of sections may be placed on the main weight within the limits of the post E.

In putting this frame on the hoof of the horse, a slight notch is cut at each side and at the extreme front of the toe where the prongs turn inward and the frame is slipped into place before the shoe is placed on the foot. When so placed, it is unnecessary to bend the prongs upward as in my previous patent.

What I claim is—

1. In a toe weight, the combination of a frame adapted to hold the same to the hoof, a weight holding post dovetailed in cross section, secured to the said frame; with a conical weight having a dovetailed groove cut through its base and adapted to engage with the post, a screw threaded hole in the apex of the cone arranged to register with a notch in said weight holding post, a screw in said hole adapted to engage the notch, half shells, each provided with a hole and dovetailed groove, adapted to engage the post and fit the surface of the conical weight, one above the other, a screw adapted to be inserted through the holes in said half shells whereby they are rigidly secured to said conical weight, substantially as described.

2. In a toe weight, the combination of a frame, composed of a loop extending over the toe, a weight holding post dovetailed in cross section, secured to the center of said loop and extending to the end of the toe, prongs secured to the ends of the loop and weight holding post, adapted to extend between the hoof and the shoe, whereby it is held to the hoof; with the conical weight G, provided with the dovetailed groove H, at its base, to engage the weight holding post, and a screw threaded hole in its apex, adapted to receive a screw whereby the weight is prevented from slipping on the post, half shells adapted to fit one above the other, on the upper surface of said conical weight, each provided with a dovetailed groove, adapted to engage said weight holding post, holes through said half shells arranged to register with each other, and a screw to engage said holes whereby said half shells are rigidly secured to the conical weight, substantially as described.

In testimony whereof I sign this specification in the presence of two witnesses.

WILLIAM N. CARLISLE.

Witnesses:
CHARLES F. BURTON,
F. CLOUGH.